(12) United States Patent
Reeser

(10) Patent No.: US 6,892,065 B2
(45) Date of Patent: May 10, 2005

(54) AUTOMATED VOICE MESSAGING SYSTEM

(75) Inventor: Brad T. Reeser, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/440,607

(22) Filed: May 19, 2003

(65) Prior Publication Data

US 2004/0234053 A1 Nov. 25, 2004

(51) Int. Cl.⁷ .............................................. H04M 1/64
(52) U.S. Cl. ....................................... 455/413; 701/36
(58) Field of Search ................................. 455/414, 417, 455/416; 379/114, 212.01, 88.08, 88.07, 88.04, 88.01, 88.18; 704/275

(56) References Cited

U.S. PATENT DOCUMENTS 4,766,604 A * 8/1988 Axberg ..................... 379/88.23
5,873,032 A * 2/1999 Cox et al. .................... 455/417
6,507,643 B1 * 1/2003 Groner ..................... 379/88.14
2004/0193343 A1 * 9/2004 Tan et al. ..................... 701/36

OTHER PUBLICATIONS

US: 2001/0033643, Mulvey et al, Oct. 25, 2001, telephone Privacy Protection System.*

* cited by examiner

Primary Examiner—Fan Tsang
Assistant Examiner—Ming Chow
(74) Attorney, Agent, or Firm—Anthony Luke Simon

(57) ABSTRACT

A method for delivering voice messages comprising receiving at least one recipient name from a user, locating at least one recipient phone number correlated to the recipient name, receiving at least one message from the user, linking the message to the recipient phone number, receiving a termination code from the user, initiating a telecommunication connection with the recipient responsive to the termination code and transmitting the message upon establishment of the telecommunication connection.

24 Claims, 6 Drawing Sheets

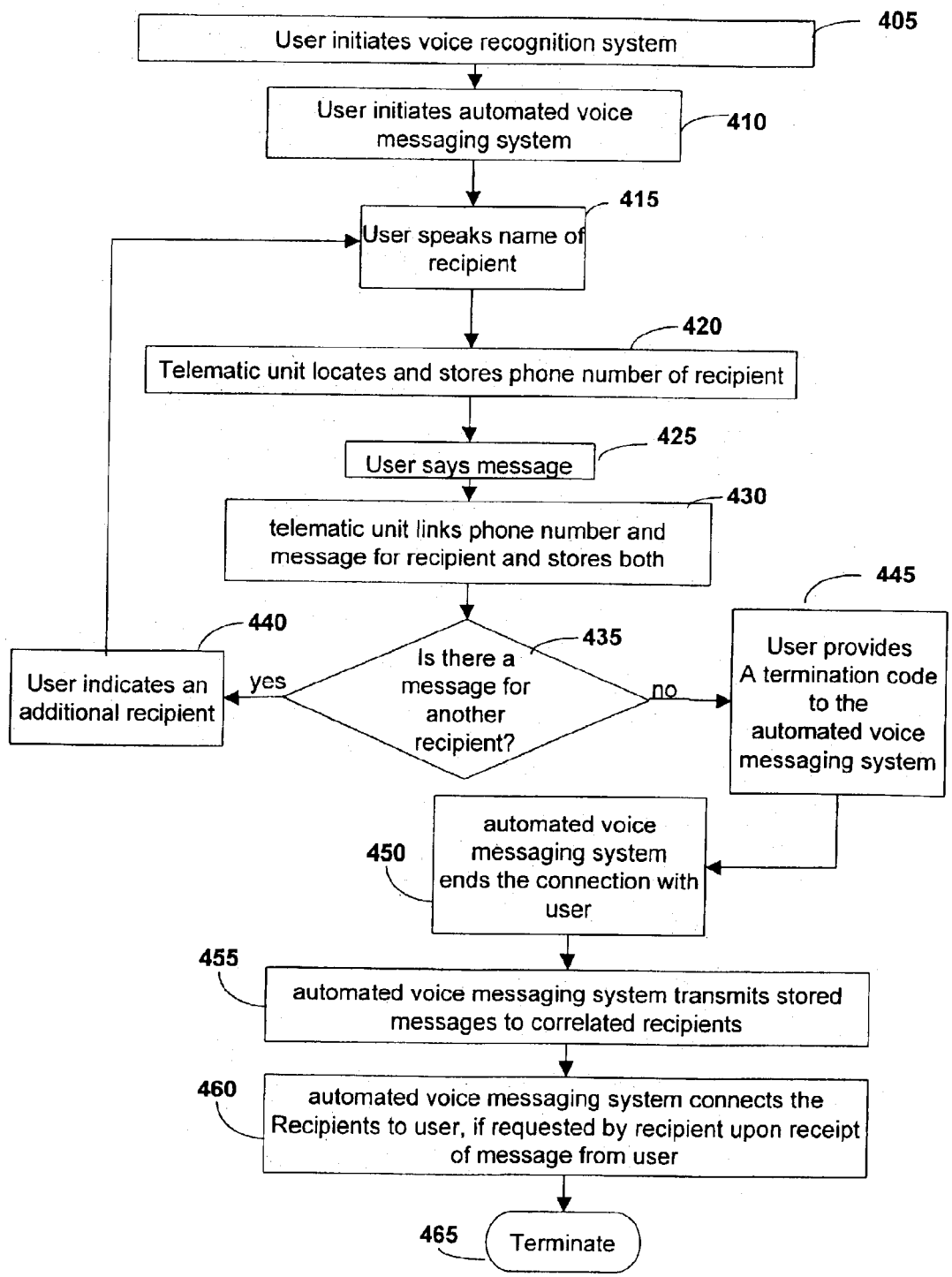

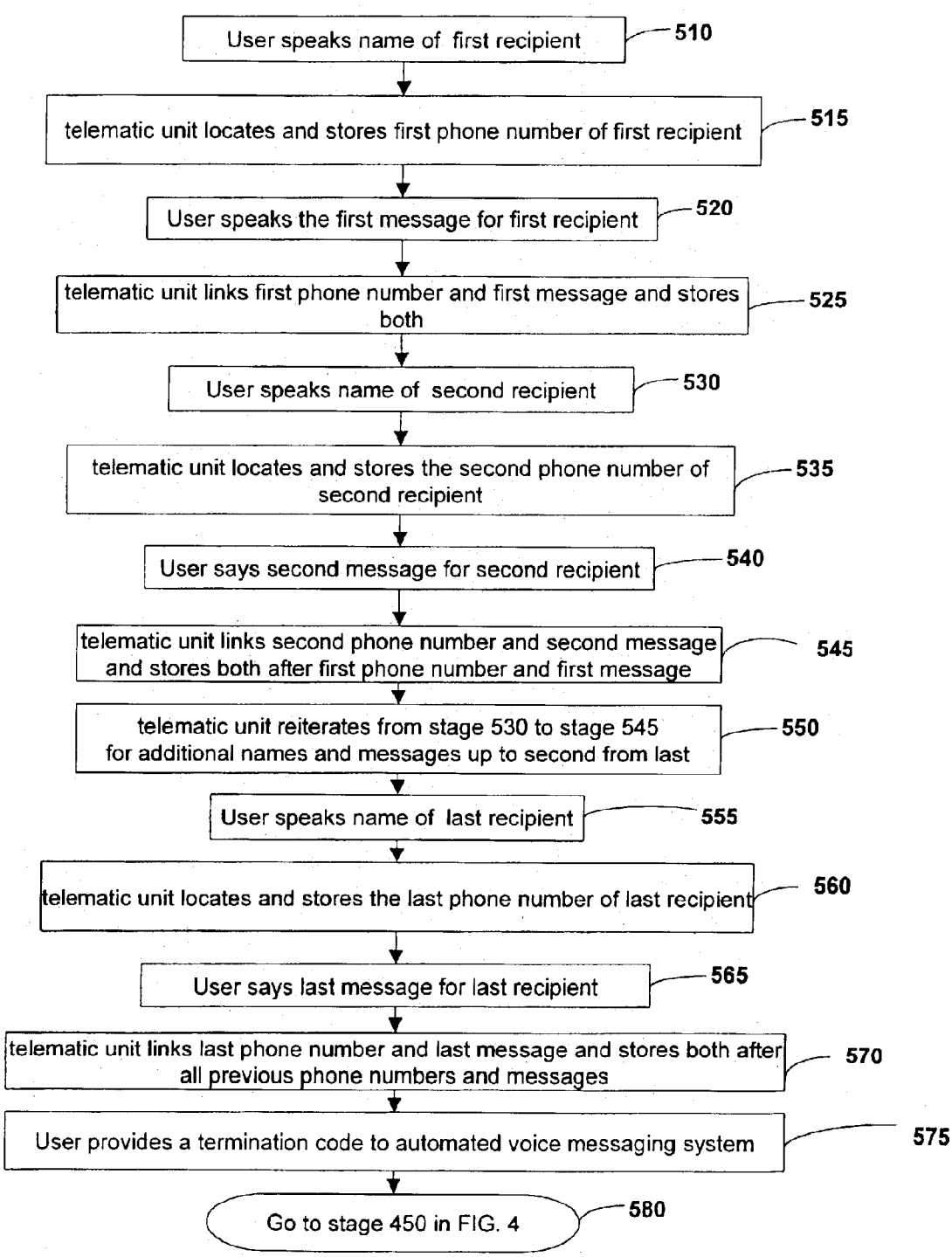

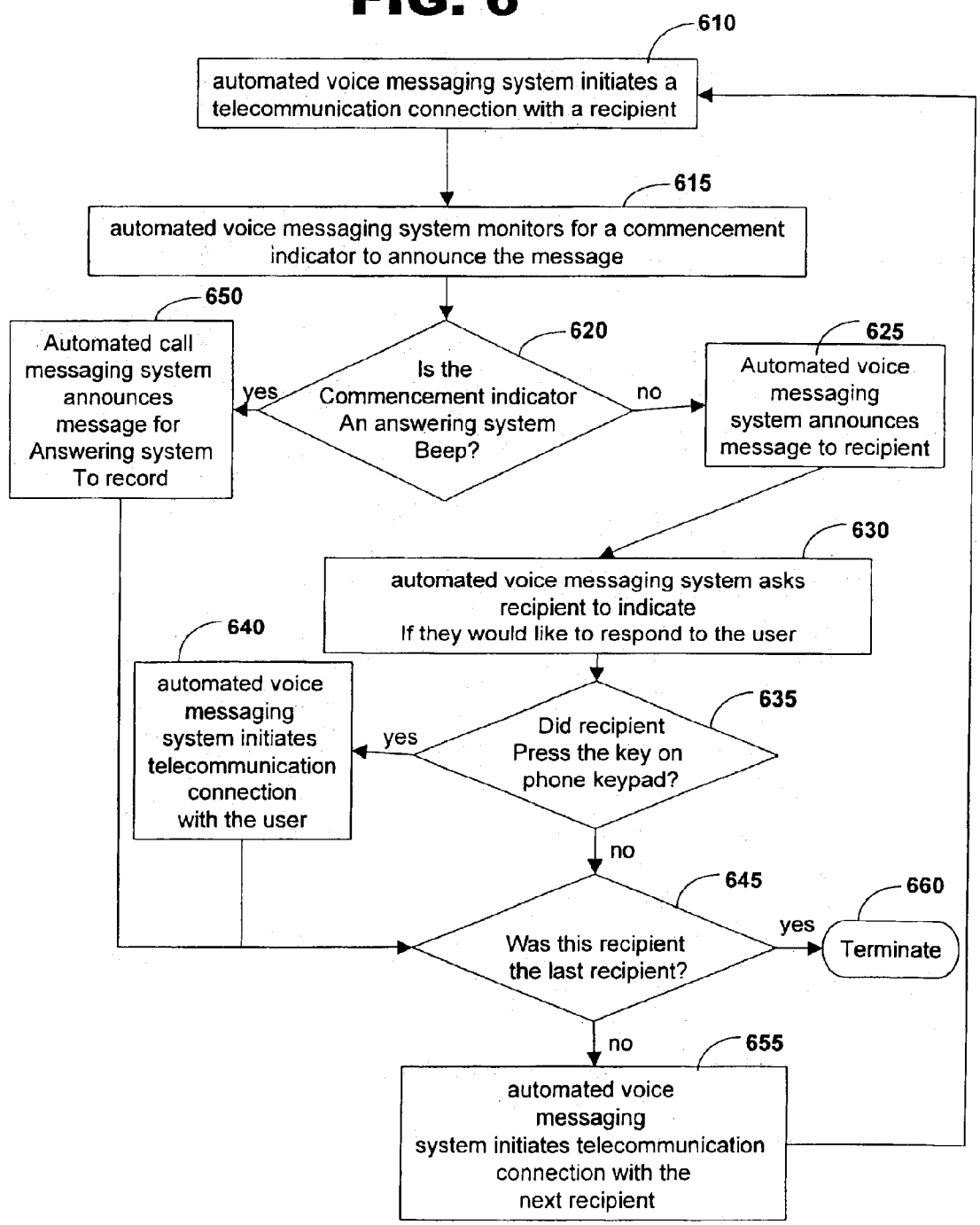

US 6,892,065 B2

AUTOMATED VOICE MESSAGING SYSTEM

FIELD OF THE INVENTION

This invention relates generally to automated voice messaging systems. In particular, the invention relates to a method, computer usable medium and system for receiving at least one voice message from a user and transmitting the at least one voice message to at least one recipient after the user has disconnected from the automated voice messaging system.

BACKGROUND OF THE INVENTION

The opportunity to personalize features in a mobile vehicle is ever increasing as the automobile is being transformed into a communications and entertainment platform as well as a transportation platform. Current projections indicate that some type of telematics unit to provide wireless communication and location-based services will be installed in a majority of new American cars by 2006. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface. Other examples are web and wireless portals that offer location-based services such as maps and driving directions where the user enters both a start and end addresses. Some of these services may have a voice interface.

The location-based services described above and current telematics services available in vehicles do not provide a way by which a user may send a series of voice messages to several different recipients by speaking the recipients' names and correlated messages into a phone for delivery after all the messages are spoken and the user has terminated the connection with the automated voice messaging system. Additionally, this service is not available on any home or business based voice messaging systems.

It is desirable, therefore, to provide a method, computer usable medium and system that overcomes the limitations described above by allowing a user to send a series voice messages to several recipients during one system interaction.

SUMMARY OF THE INVENTION

One aspect of the present invention provides a method for delivering voice messages, including receiving at least one recipient name from a user, locating at least one recipient phone number correlated to the recipient name, receiving at least one message from the user, linking the message to the recipient phone number, receiving a termination code from the user, initiating a telecommunication connection with the recipient responsive to the termination code and transmitting the message upon establishment of the telecommunication connection.

Another aspect of the present invention provides a computer usable medium for delivering voice mail messages comprising computer readable program code to receive at least one recipient name from a user, computer readable program code to locate at least one recipient phone number correlated to the recipient name, computer readable program code to receive at least one message from the user, computer readable program code to link the message to the recipient phone number, computer readable program code to receive a termination code from the user, computer readable program code to initiate a telecommunication connection with the recipient responsive to the termination code and computer readable program code to transmit the message upon establishment of the telecommunication connection.

A third aspect of the present invention provides a system for delivering voice messages, including a means for receiving at least one recipient name from a user, a means for locating at least one recipient phone number correlated to the recipient name, a means for receiving at least one message from the user, a means for linking the message to the recipient phone number, a means for receiving a termination code from the user a means for initiating a telecommunication connection with the recipient responsive to the termination code and a means for transmitting the message upon establishment of the telecommunication connection.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein:

FIG. 4 illustrates a flowchart representative of one embodiment in accordance with the present invention;

FIG. 5 illustrates a flowchart representative of sequential computer linking of multiple phone numbers and messages in accordance with the present invention; and FIG. 6 illustrates a flowchart representative providing an option to the recipient to respond to the user in accordance with the present invention.

DETAILED DESCRIPTION OF THE PRESENTLY PREFERRED EMBODIMENTS

Figure 1:
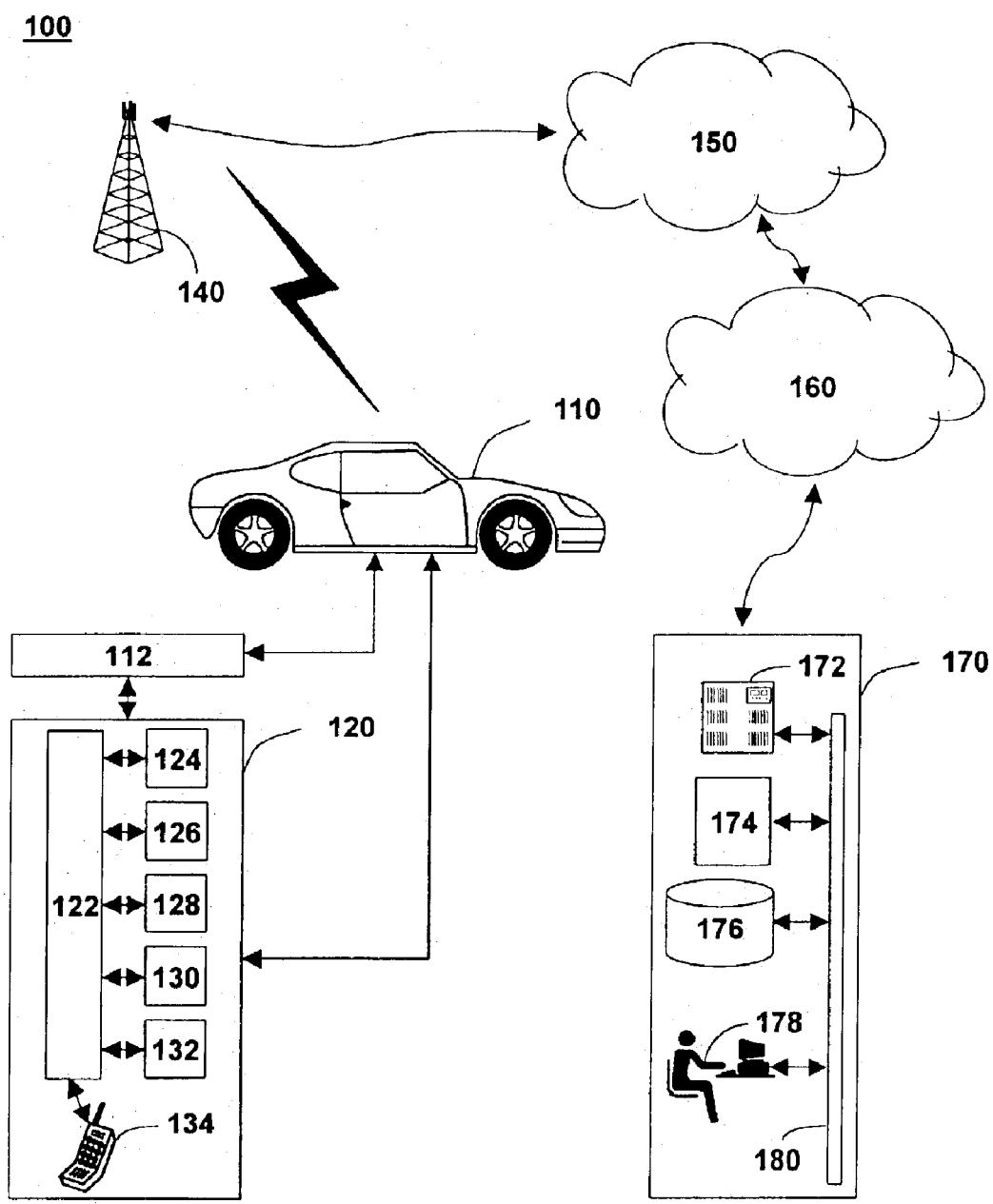
FIG. 1 is a schematic diagram of a system for providing access to a telematics unit in a mobile vehicle.

FIG. 1 is a schematic diagram of a system for providing access to a telematics unit in a mobile vehicle. Telematics-unit access system 100 includes a mobile vehicle 110, a telematics unit 120, one or more wireless carrier systems 140, one or more communication networks 150, one or more land networks 160, and one or more call centers 170. A telematics unit 120 can provide the telecommunications link in one embodiment of this present invention. In one embodiment, mobile vehicle 110 is a vehicle such as a car or truck equipped with suitable hardware and software for transmitting and receiving voice and data communications.

In one embodiment, telematics unit 120 includes a digital signal processor (DSP) 122 connected to a wireless modem 124, a global positioning system (GPS) receiver or GPS unit 126, a memory 128, a microphone 130, one or more speakers 132, and an embedded or in-vehicle phone 134. DSP 122 is also referred to as a microcontroller, microcomputer, controller, host processor, or vehicle communications processor. GPS unit 126 provides longitude and latitude coordinates of the vehicle. In-vehicle phone 134 may be an analog, digital, dual-mode, dual-band, multi-mode or multi-band cellular phone.

Telematics unit 120 stores phone numbers and messages in memory 128. Telematics unit 120 sets or resets calling-state indicators and can enable or disable various cellular-phone and telematics-unit functions when directed by microcode running on DSP 122. Telematics unit 120 can send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120. In one embodiment, DSP 122 controls communications between telematics unit 120, wireless carrier system 140, and call center 170. In one embodiment, a voice-recognition application is installed in DSP 122 that can translate human voice input through microphone 130 to digital signals. For example, programming of in-vehicle phone 134 is controlled with verbal commands that are translated by voice-recognition software executed by DSP 122. In other embodiments, pushing buttons on an interface of telematics unit 120 or in-vehicle phone 134 are used to indicate a termination code or a recipient code. In an embodiment, the interface to telematics unit 120 includes one or more buttons on the telematics unit, radio console, or associated keyboard or keypad. The interface to telematics unit 120, may include other forms of preference and data entry including touch-screens, wired or wireless keypad remotes, or other wirelessly connected devices such as Bluetooth-enabled devices, or 802.11 enabled devices such as 802.11(a), 802.11(b), and 802.11(g) devices.

DSP 122 controls, generates and accepts digital signals transmitted between telematics unit 120 and a vehicle communication bus 112 that is connected to various electronic modules and sensors in mobile vehicle 110. In one embodiment, DSP 122 activates various programming and operation modes, and provides for data transfers. Signals from DSP 122 may be translated into voice messages and sent out through speaker 132. One of the generated voice messages may include a phone number prompt given when a user has requested and entered a programming mode of in-vehicle phone 134.

Mobile vehicle 110 via telematics unit 120 sends and receives radio transmissions from wireless carrier system 140. Wireless carrier system 140 is any suitable system for transmitting a signal from mobile vehicle 110 to communication network 150.

Communication network 150 comprises services from one or more mobile telephone switching offices and wireless networks. Communication network 150 connects wireless carrier system 140 to land network 160. Communication network 150 is any suitable system or collection of systems for connecting wireless carrier system 140 to mobile vehicle 110 and land network 160. In one embodiment, communication network 150 sends and receives short messages according to established protocols such as IS-637 standards for short message service (SMS), IS-136 air-interface standards for SMS, and GSM 03.40 and 09.02 standards. Similar to paging, an SMS communication may be posted along with an intended recipient, such as a communication device in mobile vehicle 110.

Land network 160 is a public-switched telephone network. In one embodiment, land network 160 supports an Internet protocol (IP). Land network 160 may be comprised of a wired network, an optical network, a fiber network, another wireless network, or any combination thereof. Land network 160 is connected to one or more landline telephones. Land network 160 connects communication network 150 to call center 170. Communication network 150 and land network 160 may connect wireless carrier system 140 to a communication node or call center 170.

In one embodiment of the invention, call center 170 includes one or more voice and data switches 172, one or more communication services managers 174, one or more communication services databases 176, one or more communication services advisors 178, and one or more bus systems 180.

Call center 170 is a location where many calls are received and serviced at the same time, or where many calls are sent at the same time. In one embodiment, the call center 170 may be a telematics call center, prescribing communications to and from telematics unit 120 in mobile vehicle 110. In other embodiments, the call center 170 is a voice call center, providing verbal communications between an advisor in the call center and a subscriber in a mobile vehicle. In other embodiments, the call center contains each of these functions. Call center 170 may receive a telematics unit access request from a telematics user via wireless carrier system 140, communication network 150, over land network 160, or any combination thereof.

Call center 170 contains one or more voice and data switches 172. Switch 172 is connected to land network 160. In one embodiment, switch 172 transmits voice or data transmissions from call center 170, and in some embodiments, receives voice or data transmissions from telematics unit 120 in mobile vehicle 110 through wireless carrier system 140, communication network 150, and land network 160. Switch 172 receives from or sends to one or more communication services managers 174 data transmissions via one or more bus systems 180. Communication services manager 174 is any suitable hardware and software capable of providing requested communication services to telematics unit 120 in mobile vehicle 110. In one embodiment, communication services manager 174 sends to or receives from one or more communication services databases 176 data transmissions via bus system 180. In one embodiment, communication services manager 174 sends to or receives from one or more communication services advisors 178 data transmissions via bus system 180. Communication services database 176 may send to 6 or receive from communication services advisor 178 data transmissions via bus system 180. Switch 172 sends voice or data transmissions to communication services advisor 178.

Communication services manager 174 provides one or more of a variety of services, including enrollment services, navigation assistance, vehicle personalization, vehicle data upload, vehicle data download, replenish subscriber minutes, unlock/lock vehicle, flash lights, honk horn, perform diagnostic functions and perform vehicle tracking functions. In one embodiment, communication services manager 174 transmits data to telematics unit 120 in mobile vehicle 110 through wireless carrier system 140, communication network 150, land network 160, voice and data switch 172, and bus system 180. In one embodiment, communication services manager 174 stores or retrieves data and information from communication services database 176. Communication services manager 174 provides requested information to communication services advisor 178. Communication services manager 174, along with the other components of call center 170, may send over-the-air messages to enable or disable telematics unit 120 through land network 160, communication network 150, and wireless carrier system 140.

Communication services advisor 178 may be a real advisor or a virtual advisor. A real advisor is a human being in verbal communication with a user or subscriber in mobile vehicle 110 via telematics unit 120. In one embodiment, a virtual advisor is a synthesized voice interface responding to requests from telematics unit 120 in mobile vehicle 110. In one embodiment, this virtual advisor includes one or more recorded messages.

Communication services advisor 178 provides services to telematics unit 120 in mobile vehicle 110. Possible services provided by communication services advisor 178 are enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 150, and land network 160 using voice transmissions, or through communication services manager 174 and switch 172 using data transmissions.

In an example, mobile vehicle 110 initiates a service request to call center 170 by sending a voice or digital signal command to telematics unit 120 which in turn, sends an instructional signal or a voice call through wireless modem 124, in-vehicle phone 134, wireless carrier system 140, communication network 150, and land network 160 to call center 170. Call center 170 can determine mobile identification numbers and telematics unit identifiers associated with a telematics unit access request, compare mobile identification numbers and telematics unit identifiers with a database of identifier records, and send calling-state messages to the telematics unit based on the request and identification numbers.

Software including a program to provide access to the telematics unit may reside, at least in part, at the call center. In one embodiment, the program includes computer program code to receive a telematics unit access request, to determine a mobile identification number, and to determine a telematics unit identifier. The program compares the mobile identification number and the telematics unit identifier with a database of identifier records, and sends a calling-state message based on the telematics unit access request. The software may be provided on any suitable computer usable medium such as a compact disc, digital video disc, magnetic media, semiconductor memory, non-volatile or permanent memory.

Computer program code, residing on any suitable computer usable medium such as magnetic, optical, or semiconductor media, stores the updated mobile identification number and calling-state indicator in the telematics unit, and enables the cellular phone. Computer program code to set the calling-state indicator to a predefined billing state and to disable the embedded cellular phone resides, at least in part, within the telematics unit and is executed by a processing unit within the telematics unit.

Figure 2:
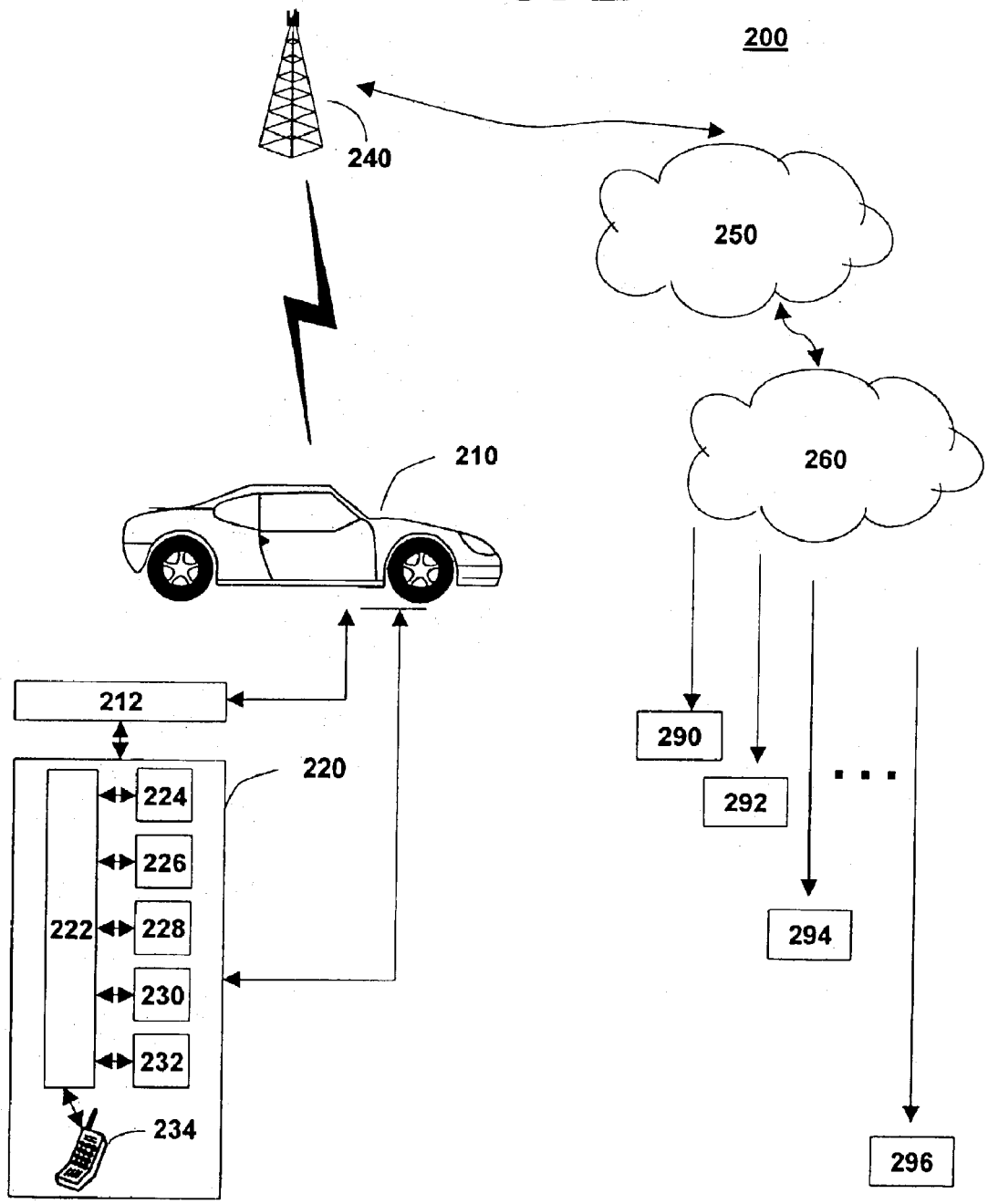
FIG. 2 is a schematic diagram of a system for providing access to an automated voice messaging system, in accordance with a first embodiment of the present invention.

FIG. 2 illustrates schematically a first embodiment of an automated voice messaging system. The mobile vehicle 210 has a telematics unit 220 as described in FIG. 1, which communicates with the external telecommunication system, which comprises one or more wireless carrier system 240, one or more communication networks 250 and one or more land networks 260. A peripheral link with the center 270 can be established for automated voice messaging system usage monitoring, and other desired functions, but such a link is not illustrated in FIG. 2.

The user (not shown) in mobile vehicle 210 speaks a series of messages for several recipients into the microphone 230 of telematics unit 220. The recipient phone numbers and the messages are stored in memory 228 of the telematics unit 220. When the user in mobile vehicle 210 disconnects from the automated voice messaging system, the messages are delivered by the telematics unit 220 via the external telecommunication system, which comprises one or more wireless carrier system 240, one or more communication networks 250 and one or more land networks 260. The message can be delivered sequentially in time, to first recipient 290 or their answering system, to second recipient 292 or their answering system, third recipient 290 or their answering system and eventually to the last recipient 296 or their answering system.

Figure 3:
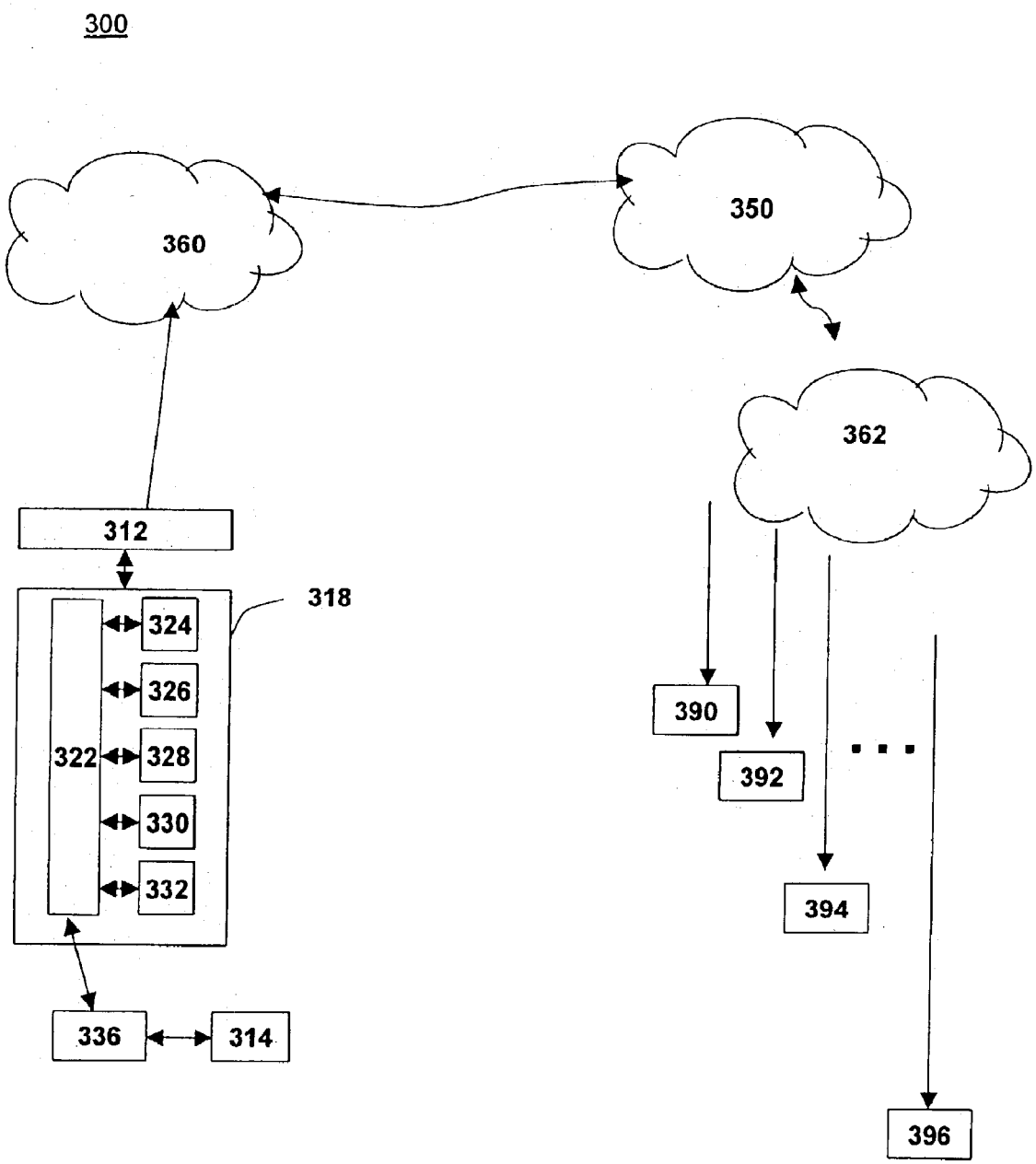
FIG. 3 is a schematic diagram of a system for providing access to an automated voice messaging system, in accordance with a second embodiment of the present invention.

FIG. 3 illustrates schematically a second embodiment of an automated voice messaging system. In this second embodiment, the user 314 initiating the automated voice messaging system is not in a mobile vehicle 310, but is in a building using telephone 136, with a connection to a telematics unit 318. Telematics unit 318 is similar to the telematics unit 320 in the mobile vehicle 310 except it operates with telephone 336 rather than the embedded or in-vehicle cellular phone 334. In another embodiment, telematics unit 318 is modified to exclude the global positioning system (GPS) receiver or GPS unit 326. In another embodiment, the wireless modem 324 is a wired modem. Telematics unit 318 can be embedded in the telephone 336 or it can be connected externally to the telephone 336. Alternately, telephone 336 can be a cell phone with a wireless connection to telematics unit 318.

The telematics unit 318 is illustrated in FIG. 3 has a connection to the external telecommunication system. The illustrated external telecommunication system consists of a first land network 360, a communication network 350 and a second land network 362. The second land network 362 is connected with several recipients or recipient's answering systems (390–396). In some embodiments, there may be one or more first and second land networks 360 and 362 and one or more communication networks 350 needed to communicate with the several recipients or recipient answering systems (390–396). If the telephone 336 is a cell phone, then the external telecommunication system can include one or more wireless carrier systems 340 connected, as shown in FIG. 1, to one or more communication networks 350 and to one or more land networks 360.

The user 314 speaks into the microphone 330 to leave one or more messages stored in memory 328 in the telematics unit 318 for one or more recipients. After the user 314 disconnects from the automated voice messaging system, the telematics unit 318 delivers the messages, sequentially in time, to first recipient 390 or their answering system, to second recipient 392 or their answering system, third recipient 390 or their answering system and eventually to the last recipient 396 or their answering system via the external telecommunication system. The answering system may comprise an answering machine.

FIG. 4 illustrates a flow chart 400 for the embodiments of the present invention illustrated in FIG. 2 and FIG. 3. The discussions regarding flow charts 400, 500 and 600 in FIG. 4 through FIG. 6 are related to the illustrations in FIG. 2 and FIG. 3. During stage 405 of flowchart 400, a user initiates the voice recognition system. A voice-recognition application can be installed in DSP 122, 222, 322 to translate human voice input through microphone 130, 230, 330 to digital signals. For example, spoken commands and names are translated by voice-recognition software executed by DSP 122, 222, 322. During stage 410, the user initiates the automated voice messaging system with a known phrase, such as, for example, "Automated call messaging." During stage 415, the user 30 speaks the name of the recipient. The user will have previously entered the recipient name and a correlated phone number in the memory 128, 228, 328. The user can check to verify the directory of contents in the memory 128, 228, 328, prior to initiating the automated voice messaging system. During stage 420 the telematic unit 120, 220, 318 locates and stores the phone number of the recipient 290, 390. During stage 425, the user speaks the message. During stage 430, the telematic unit 120, 220, 318 links the phone number, located and stored during stage 420, with the message spoken in stage 425 and stores the linked data.

Stage 435 is a decision point, during which the user may or may not have a second message for a second recipient 292, 392. During stage 440, the user indicates that there is a second recipient 192, 392 and the flow returns to stage 415 to progress through stages 420 to 435, at which point the cycle through stages, 440, 415, 420, 425, and 435 is repeated until the decision at stage 435 is "no." Once the decision at stage 435 is "no," the user, during stage 445, provides a termination code, stored in memory 128, 228, 328, to the automated voice messaging system. Then the automated voice messaging system ends the connection with the user. The user can then transact other business, while the automated voice messaging system establishes a telecommunication connection to the external telecommunication system, comprised of 140, 150, and 160 of FIG. 1 and 240, 250, and 260 of FIG. 2 and 350, 360, and 362 of FIG. 3, to transmit the stored messages to the correlated recipients (290–296 and 390–396) during stage 455. During stage 460, after delivery of each message to each recipient (290–296 and 390–396) the automated voice messaging system will establish a telecommunication connection to the external telecommunication system, comprised of 140, 150, and 160 of FIG. 1 and 240, 250, and 260 of FIG. 2 and 350, 360, and 362 of FIG. 3, for the recipient (290–296 and 390–396) to respond to the user, if the recipient (290–296 and 390–396) requests that service.

After all the recipients have received their correlated messages, the flow terminates during stage 465. The messages can be delivered simultaneously or sequentially in time by the automated voice messaging system.

FIG. 5 illustrates a flowchart 500 representative of sequential computer linking of multiple phone numbers and messages in accordance with the present invention. During stage 510, a user speaks the name of the first recipient 290 or 390. During stage 515 the telematic unit 120, 220 or 318 locates and stores the first phone number of the first recipient 290, 390. During stage 520, the user speaks the first message. During stage 525, the telematic unit 120, 220 or 318 links the first phone number located and stored during stage 515 with the first message and stores the linked first phone number and first message. During stage 530 the user speaks the name of a second recipient 292, 392. During stage 535 the telematic unit 120, 220 or 318 locates and stores the second phone number of the second recipient 292, 392. During stage 540, the user speaks the second message. During stage 545, the telematic unit 120, 220 or 318 links the second phone number located and stored during stage 535 with the second message and stores the linked second phone number and second message after the linked first phone number and first message. The storage of the linked second phone number and second message after the linked first phone number and first message may not be physically co-located into the memory 128, 228, 328, but rather, will at least be retrieved sequentially in time by the digital signal processor (DSP) 122, 222, 322. During stage 550, the telematic unit 120, 220 or 318 continues to link additional phone numbers located and stored with the additional correlated messages by storing the additional linked phone numbers and messages each sequentially one after the other based on input from the user until the second from last number and message is stored. During stage 555, the user speaks the name of the last recipient 296, 396. During stage 560, the telematic unit 120, 220 or 318 locates and stores the last phone number of the last recipient 296, 396. During stage 565, the user speaks the last message. During stage 570, the telematic unit 120, 220 or 318 links the last phone number located and stored during stage 560 with the last message and stores the linked last phone number and last message after the linked second from last phone number and second from last message. During stage 575, the user provides a termination code to the automated voice messaging system. The termination code may be provided by spoken word or pressing a key on a dial pad. During stage 580, the flow chart 500 indicates that the flow will be continued at stage 450 in flow chart 400 of FIG. 4.

If the user does not require the messages to be delivered to the recipients (290–296, 390–396) in the order spoken, then the automated voice messaging system can be programmed to receive notification of that from the user. In that case the automated voice messaging system can deliver the messages in another order and they will not be stored for sequential delivery, but rather, will be stored for delivery based upon another criteria, such as, for example, the area code of the phone number. In any event the linking of the stored phone number with the correlated message will always be done.

FIG. 6 illustrates a flowchart 600 representative of the details of providing an option to the recipient to respond to the user, which is stage 460 in flowchart 400 of FIG. 4. During stage 610 of flowchart 600 the automated voice messaging system initiates a telecommunication connection with a recipient (290, 292, 294 or 296, 390, 392, 394 or 396). During stage 615 the automated voice messaging system monitors for a commencement indicator to announce a message. The commencement indicator can be a human voice answering the phone or the beep of an answering system. During stage 620, a decision is made as to whether the answering system is receiving the message. If "no", then a human has responded and the automated voice messaging system having retrieved the stored message for the recipient, then announces the message to the recipient, during stage 625. During stage 630, the automated voice messaging system asks the recipient to indicate if they would like to respond to the user. The decision at stage 635 is based on the recipient indicating "yes" or "no". This decision can be indicated in various way, such as, for example, a verbal "yes" or "no" or by pressing one specific key on the recipient's (290, 292, 294 or 296, 390, 392, 394 or 396) phone keypad for "yes" and by pressing another specific key on the phone keypad for "no." Alternately, the recipient may hang up to indicate "no" and press any key on the phone keypad to indicate "yes."

If the recipient (290, 292, 294 or 296, 390, 392, 394 or 396) indicates "yes", then the flow moves onto stage 640, during which the automated voice messaging system initiates a telecommunication connection to the external telecommunication system, which can be comprised of one or more wireless carrier systems 140, 240, one or more communication networks 150, 250, 350, and one or more land networks 160, 260, 360. This telecommunication connection is from the recipient to the user. Then the flow moves to stage 645.

If during the decision at stage 635 the recipient indicates "no,", the flow continues to stage 645.

During the decision at stage 620, if the automated voice messaging system recognizes that "yes" the answering system has responded, then the automated voice messaging system having retrieved the stored message for the recipient announces the message to the recipient's answering system during stage 650. Then flow then continues to stage 645.

During the decision stage 645, the automated voice messaging system determines if the previous recipient is the last recipient 296, 396. If "no", the flow takes the automated voice messaging system to stage 655, during which the automated voice messaging system initiates a telecommunication connection with the next recipient. If the decision at stage 645 results in a "yes" the automated voice messaging system terminates the process during stage 660.

The automated voice messaging system described here will allow the user 114 to make one connection to the automated voice messaging system in place of establishing several telecommunication connections to speak to a recipient or a recipient's answering system. This will save the user time. The user does not need to wait for the connection to each recipient and the user does not need to spend time making the customary introduction to each recipient (290, 292, 294 or 296, 390, 392, 394 or 396). It is often desirable for a user to make several phone calls at one time.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for delivering voice messages, the method comprising:

receiving at least one recipient name from a user of a telematics unit;

locating at least one recipient phone number correlated to the recipient name in the telematics unit;

storing the located recipient phone number in the telematics unit;

receiving at least one message from the user;

storing the received message in the telematics unit;

linking the stored message to the stored recipient phone number within the telematics unit;

receiving a termination code from the user;

initiating a telecommunication connection by the telematics unit with a recipient responsive to the termination code; and transmitting the stored message upon establishment of the telecommunication connection.

2. The method of claim 1, wherein receiving at least one recipient name from a user of a telematics unit comprises:

recognizing the recipient name spoken by the user.

3. The method of claim 1, wherein receiving at least one recipient name from a user of a telematics unit comprises:

recognizing a recipient code input by the user.

4. The method of claim 1, wherein locating at least one recipient phone number correlated to the recipient name in the telematics unit comprises:

recognizing the recipient name;

searching a memory in the telematics unit storing the recipient name correlated to the recipient phone number; and retrieving the correlated recipient phone number.

5. The method of claim 1, wherein receiving at least one message from the user comprises:

recognizing words spoken by the user; and digitally recording the recognized words for transmission.

6. The method of claim 1, wherein linking the stored message to stored recipient phone number within the telematics unit comprises:

linking in a sequential manner a plurality of stored recipient phone numbers with a correlated plurality of stored messages.

7. The method of claim 1, wherein receiving a termination code from the user comprises:

recognizing the termination code spoken by the user; and disconnecting the user from an automated voice messaging system of the telematics unit.

8. The method of claim 1, wherein transmitting the stored message upon establishment of the telecommunication connection occurs, at least in part, on a wireless telecommunication system.

9. The method of claim 1, wherein transmitting the stored message upon establishment of the telecommunication connection occurs, at least in part, on a landline telecommunication system.

10. The method of claim 1, wherein transmitting the stored message upon establishment of the telecommunication connection comprises:

monitoring for a commencement indicator, and announcing the message to the recipient upon receipt of the commencement indicator.

11. The method of claim 10, wherein the commencement indicator is a human voice or a beep from an answering system.

12. The method of claim 1, further comprising:

providing an option for the recipient to respond to the user;

recognizing when the recipient accepts the option to respond to the user; and providing a telecommunication connection between the recipient and the user.

13. A computer usable medium for delivering voice mail messages comprising:

computer readable program code to receive at least one recipient name from a user of a telematics unit;

computer readable program code to locate at least one recipient phone number correlated to the recipient name in the telematics unit;

computer readable program code to score the located recipient phone number in the telematics unit;

computer readable program code to receive at least one message from the user;

computer readable program code to store the received message in the telematics unit;

computer readable program code to link the stored message to the stored recipient phone number within the telematics unit;

computer readable program code to receive a termination code from the user;

computer readable program code to initiate a telecommunication connection by the telematics unit with a recipient responsive to the termination code; and computer readable program code to transmit the stored message upon establishment of the telecommunication connection.

14. The computer usable medium of claim 13, further comprising:

computer readable program code to recognize the recipient name spoken by the user.

15. The computer usable medium of claim 13, further comprising:

computer readable program code to recognize a recipient code input by the user.

16. The computer usable medium of claim 13, further comprising:

computer readable program code to recognize the recipient name;

computer readable program code to search a memory in the telematics unit storing the recipient name correlated to the recipient phone number; and computer readable program code to retrieve the correlated recipient phone number.

17. The computer usable medium of claim 13, further comprising:

computer readable program code to recognize words spoken by the user, and computer readable program code to digitally record the recognized words for transmission.

18. The computer usable medium of claim 13, further comprising:

computer readable program code to link in a sequential manner a plurality of stored recipient phone numbers with a correlated plurality of stored messages.

19. The computer usable medium of claim 13, further comprising:

computer readable program code to recognize the termination code spoken by the user; and computer readable program code to disconnect the user from an automated voice message system of the telematics unit.

20. The computer usable medium of claim 13, further comprising:

computer readable program code to monitor for a commencement indicator; and computer readable program code to announce the message to the recipient upon receipt of the commencement indicator.

21. The computer usable medium of claim 13, further comprising:

computer readable program code to provide an option for the recipient to respond to the user, and computer readable program code to recognize when the recipient accepts the option to respond to the user; and computer readable program code to provide a telecommunication connection between the recipient and the user.

22. A system for delivering voice messages, comprising;

means for receiving at least one recipient name from a user of a telematics unit;

means for locating at least one recipient phone number correlated to the recipient name in the telematics unit;

means for storing the located recipient phone number in the telematics unit;

means for receiving at least one message from the user;

means for storing the received message in the telematics unit;

means for linking the stored message to the stored recipient phone number within the telematics unit;

means for receiving a termination code from the user;

means for initiating a telecommunication connection by the telematics unit with a recipient responsive to the termination code; and means for transmitting the stored message upon establishment of the telecommunication connection.

23. The system of claim 22, further comprising:

means for linking in a sequential manner a plurality of stored recipient phone numbers with a correlated plurality of stored messages.

24. The system of claim 22, further comprising:

means for providing an option for the recipient to respond to the user; and means for recognizing when the recipient accepts the option to respond to the user; and means for initiating a telecommunication connection from recipient to the user.

* * * * *